US008388155B2

(12) United States Patent
Carey

(10) Patent No.: US 8,388,155 B2
(45) Date of Patent: Mar. 5, 2013

(54) ON-AXIS COLLIMATOR REFLECTOR

(75) Inventor: Bojana Ozegovic Carey, Elmhurst, IL (US)

(73) Assignee: Honeywell International Inc., Morristown, NJ (US)

( * ) Notice: Subject to any disclaimer, the term of this patent is extended or adjusted under 35 U.S.C. 154(b) by 426 days.

(21) Appl. No.: 12/732,410

(22) Filed: Mar. 26, 2010

(65) Prior Publication Data

US 2011/0235331 A1 Sep. 29, 2011

(51) Int. Cl.
*G03B 15/02* (2006.01)

(52) U.S. Cl. ............ 362/16; 362/3; 362/10; 362/296.01

(58) Field of Classification Search ................ 362/3, 10, 362/16, 296.01
See application file for complete search history.

(56) References Cited

U.S. PATENT DOCUMENTS 2,256,763 A * 9/1941 Reed ............................ 248/484
2,275,687 A * 3/1942 Schubert ......................... 355/63
2,672,313 A * 3/1954 Poole ......................... 248/182.1
2,697,776 A * 12/1954 Wale ................................ 362/9
2,700,523 A * 1/1955 Pollard ...................... 248/181.1
2,776,364 A * 1/1957 Daniels ............................ 362/4
5,548,271 A 8/1996 Tsuchiyama et al.
2005/0184632 A1* 8/2005 Galvez et al. ................ 313/113

FOREIGN PATENT DOCUMENTS

EP 1 650 722 A2 4/2006
JP 04-137301 5/1992

OTHER PUBLICATIONS

European Search Report, dated Aug. 1, 2011, corresponding to Application No. EP 11 15 6884.

* cited by examiner

*Primary Examiner* — Ali Alavi
(74) *Attorney, Agent, or Firm* — Husch Blackwell LLP

(57) ABSTRACT

An annunciator is provided. The annunciator includes a parabolic reflector formed from an insulating material, a reflective layer of metal disposed on a surface of the reflector, a high voltage strobe lamp disposed at a focal point of the reflector with a set of conductors of the strobe lamp extending through a center aperture of the reflector and a portion of the reflector proximate the aperture devoid of metallization.

17 Claims, 3 Drawing Sheets

ON-AXIS COLLIMATOR REFLECTOR

FIELD OF THE INVENTION

The field of the invention relates to strobe lamps and more particularly to strobe lamps for security system annunciators.

BACKGROUND OF THE INVENTION

Annunciators can often serve a very important purpose in security systems. For example, security lapses can often represent risk to human life. Annunciators can function to notify occupants of the existence of the lapse as well the type of lapse.

Annunciators can be audible or visual or both. However, in order to accommodate persons with visual or auditory impairments, annunciators for security systems usually include both audible and visual alerting devices.

In order to reduce costs, security systems are often provided with a number of annunciators, sensors and access control devices interconnected with a control panel via radio frequency links. In some cases, these devices are battery powered.

In order to extend battery life, annunciators used in such systems must be constructed to use as little battery energy as possible. One solution to this problem has been to use strobe lights for visual annunciation.

In general, a strobe light consumes significantly less energy than a conventional fluorescent or incandescent light source. The low energy consumption results from the low cycle time of a strobe light and also because of the brilliant contrast produced when the strobed light flash occurs.

In order to further reduce energy consumption, strobe lights are also often used with collimating reflectors that collimate the light from the strobe into a light diffusing lens. Collimating the light from the strobe onto a diffusing lens causes the light source to appear much larger than the actual light emitting source presented by the strobe light. Because of the importance of strobe lights in security systems, there is a need for better methods of constructing such devices.

DETAILED DESCRIPTION OF AN ILLUSTRATED EMBODIMENT OF THE INVENTION

Figure 1:
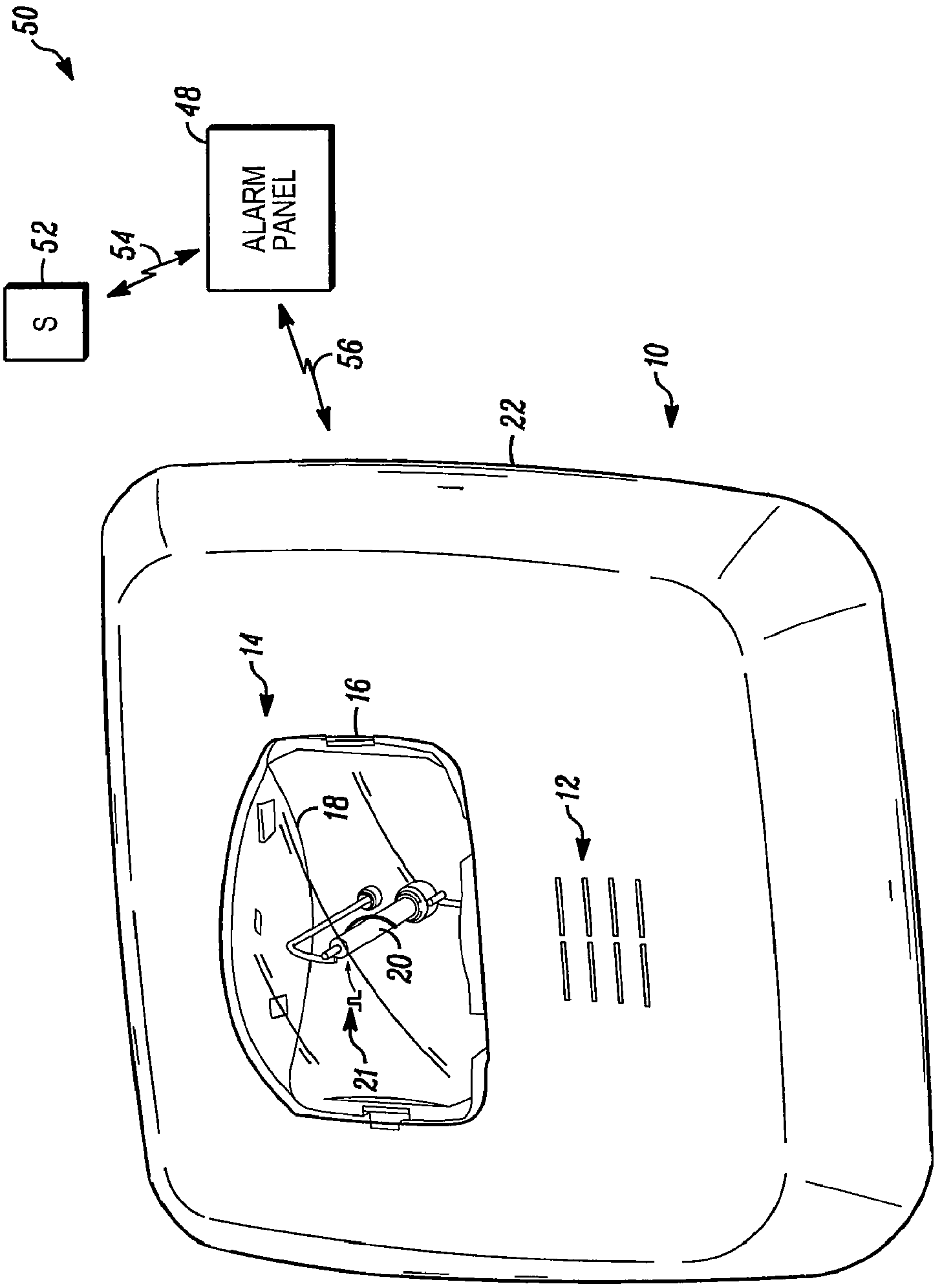
FIG. 1 is a front perspective view of an annunciator in accordance with an illustrated embodiment of the invention.

FIG. 1 depicts a security system 50 shown generally in accordance with an illustrated embodiment of the invention. The alarm system 50 may include an alarm panel 48, one or more sensors 52 and an alarm annunciator 10. Under one illustrated embodiment, the alarm system 50 may be a fire alarm system. In this embodiment, the sensors 52 may be smoke or flame sensors.

In the event of a fire, the one or more sensors 52 may enter an activated state and send an alarm signal 54 to the alarm panel 48. The alarm panel 48 may respond by sending alarm signal 56 to the annunciator 10 activating the annunciator 10.

Figure 2:
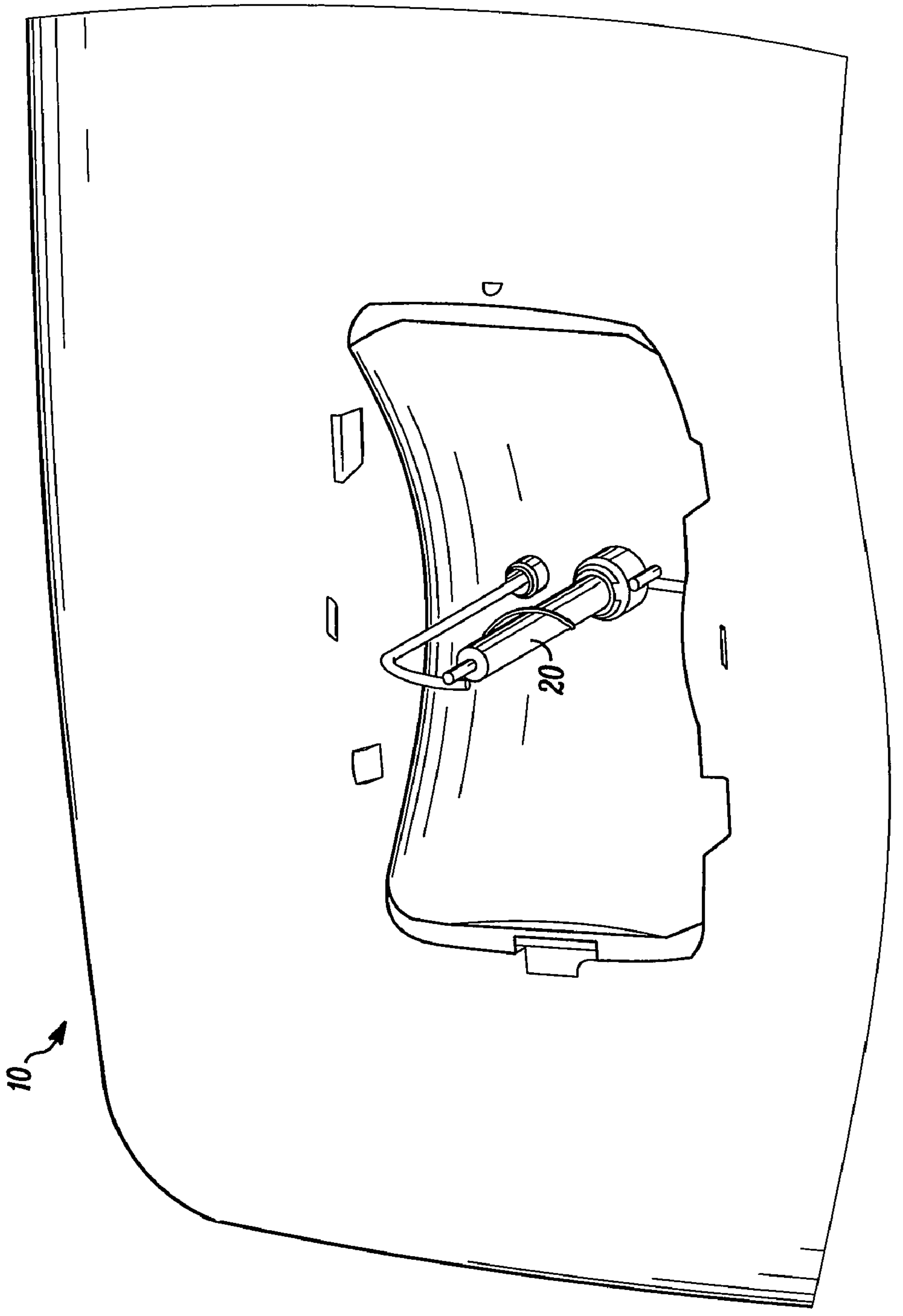
FIG. 2 is a close-up view of the annunciator of FIG. 1 with the lens removed.
Figure 3:
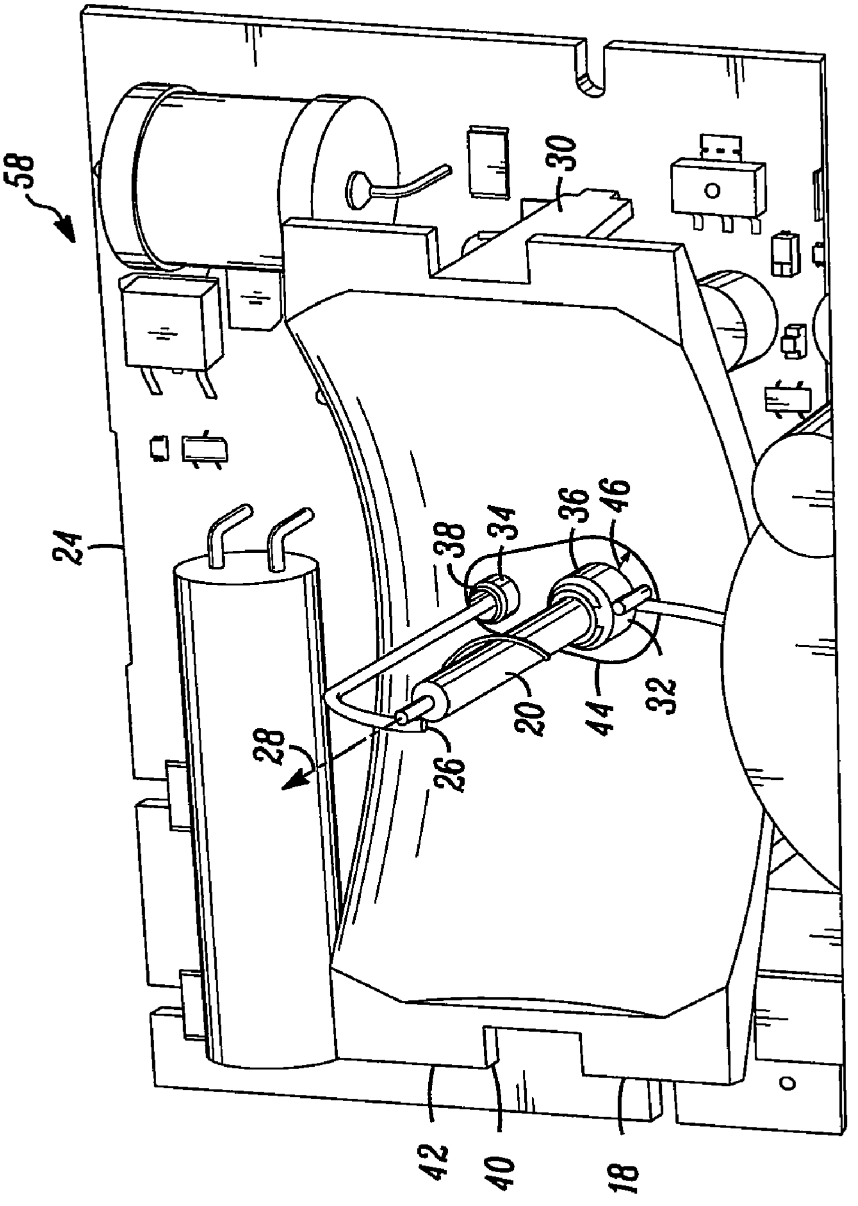
FIG. 3 is a close-up view of the annunciator of FIG. 1 with the cover removed.

The annunciator 10 may include an audible transducer assembly 12 and a visual transducer assembly 14. The visual transducer assembly 14 includes a diffusion lens 16, a shaped reflector 18 and a strobe light 20. FIG. 2 shows a close-up view of the annunciator 10 with the diffusion lens 16 removed. FIG. 3 shows a close-up view of the annunciator 10 of FIG. 1 with the cover 22 also removed.

As shown in FIG. 3, the reflector 18 and strobe light 20 are supported by a printed circuit board (PCB) 24. Similarly, the PCB 24 supports and is attached to the cover 22.

Included on the PCB 24 is a pulsing circuit 58 that periodically (e.g., every 2 seconds, every 5 seconds, etc.) applies a strobe voltage (i.e., high voltage pulse) 21 to the strobe light 20. The pulsing circuit may be battery powered under control of an activating signal from the alarm panel 48.

The reflector 18 functions to receive incident light from the strobe lamp 20 and to reflect incident light in accordance with the design objectives of the annunciator 10. For example, the reflector 18 may have a modified parabolic shape in two or three dimensions in order to direct incident light outwards from the reflector 18 parallel to a longitudinal axis 28 of the strobe light 20 and into the diffusion lens 16.

The reflector 18 may have a parabolic shape centered on the base of the strobe lamp 20 with a focal point of the parabola centered at a midpoint along the length of the strobe light 20. Alternatively, the parabolic shape may be modified to reflect the fact that the strobe light 20 generates light along the finite length of a gas discharge tube and not from the point source that would otherwise define a parabola.

The reflector 18 may be supported and/or attached to the PCB 24 at a number of locations. For example, a post 30 on opposing ends of reflector 18 may be attached to the PCB 24. The reflector 18 may also be attached via a set of apertures 32, 34 extending through the center of the reflector 18. In this case, an insulating bushing 36, 38 may extend through the reflector 18 and where a conductor of the flash tube 20 and second conductor 26 may extend through the bushings 36, 38 to form an electrical connection with a respective set of conductors on the PCB 24.

A body 40 of the reflector 18 may be fabricated of an appropriate insulating structural material (e.g., plastic, nylon, etc.). An upper surface of the reflector 18 is coated with a metalized layer 42 of an appropriate reflective material (e.g., chrome).

One feature of the reflector 18 is an insulation stand-off region 44 that is devoid of the metallic coating 42. The region 44 surrounds the electrical feedthrough apertures 32, 34 of the strobe 20. The stand-off region 44 may have an appropriate width (e.g., ⅛ inch, ¼ inch, etc.) 46 between the feedthrough conductors and metalized layer 42 to prevent electrical flashover from the electrically charged conductors of the strobe 20 to the metalized layer 42 when the strobe 20 is fired or otherwise activated. The width may be based upon the type of strobe 20. For example, if the strobe 20 is a zenon tube, then the width may be ⅛ inch or more depending upon the voltage required and upon the type of gas used in the gas discharge tube of the strobe 20.

The stand-off region 44 may be created using any of a number of different methods. Under a first method, the region 44 may be coated with a protective coating before a plating process that adds the metalized layer 42 to the body. After plating, the protective layer is removed. Alternatively, the entire upper surface of the body 42 may be plated and then masked for removal of the plating in the stand-off region by etching.

Under still another embodiment, the region 44 may be masked before a plating process that adds the metalized layer 42 to the masked body. After plating, the mask is removed and reused on the next reflector 18.

The stand-off region 44 simplifies the construction of strobe lamps. By providing the stand-off region 44, the bushings 36, 38 can be considerably smaller with a lower flashover rating.

A specific embodiment of a visual annunciator has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A device comprising:

a parabolic reflector formed from an insulating material;

a reflective layer of metal disposed on a surface of the reflector;

a strobe lamp disposed at a focal point of the reflector with a pair of conductors of the strobe lamp extending through a center aperture of the reflector; and a oblong-shaped portion of the reflector proximate to and surrounding the aperture that is devoid of metallization and with a conductor of the pair of conductors that extract through each end of the oblong-shaped portion.

2. The device as in claim 1 wherein the strobe lamp further comprises a Xenon bulb.

3. The device as in claim 1 further comprising a printed circuit board that supports the reflector and strobe lamp.

4. The device as in claim 1 further comprising an annunciator for a security system.

5. The device as in claim 1 wherein the parabolic reflector defines a parabola in three dimensions.

6. A device comprising:

a shaped reflector formed from an insulating material;

a reflective layer of metal disposed on a surface of the reflector;

a lamp disposed at a focal point of the shaped reflector with two conductors of the lamp extending through a center aperture of the reflector; and an oblong-shaped portion of the reflector proximate the aperture devoid of metallization and with a conductor of the two conductors extending through each end of the oblong-shaped portion.

7. The device as in claim 6 wherein the parabolic reflector defines a parabola in a single dimension.

8. The device as in claim 7 wherein the shape of the reflector is parabolic.

9. The device as in claim 7 wherein the lamp is strobe lamp.

10. The device as in claim 9 wherein the strobe lamp further comprises a Xenon bulb.

11. The device as in claim 7 further comprising a printed circuit board that supports the reflector and strobe lamp.

12. The device as in claim 7 further comprising an annunciator for a security system.

13. A device comprising:

a collimating reflector formed from an insulating material;

a reflective layer of metal disposed on a surface of the reflector;

a high voltage lamp disposed at a focal point of the collimating reflector with a set of two conductors of the strobe lamp extending through a center aperture of the reflector; and an oblong-shaped portion of the reflector proximate the aperture devoid of metallization with a conductor of the two conductors extending through each end of the oblong-shaped portion.

14. The device as in claim 13 wherein the parabolic reflector defines a parabola in three dimensions.

15. The device as in claim 13 further comprising an annunciator for a security system.

16. The device as in claim 13 wherein the lamp is strobe lamp.

17. The device as in claim 16 wherein the strobe lamp further comprises a Xenon bulb.

* * * * *